US012238046B2

(12) United States Patent
Abotabl et al.

(10) Patent No.: US 12,238,046 B2
(45) Date of Patent: Feb. 25, 2025

(54) TECHNIQUES FOR FULL-DUPLEX COMMUNICATIONS BASED ON A REFERENCE SIGNAL CONFIGURATION

(71) Applicant: QUALCOMM Incorporated, San Diego, CA (US)

(72) Inventors: Ahmed Attia Abotabl, San Diego, CA (US); Gabi Sarkis, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/244,815

(22) Filed: Apr. 29, 2021

(65) Prior Publication Data
US 2021/0344474 A1    Nov. 4, 2021

Related U.S. Application Data

(60) Provisional application No. 63/019,039, filed on May 1, 2020.

(51) Int. Cl.
*H04L 5/14* (2006.01)
*H04B 7/12* (2006.01)
*H04L 5/00* (2006.01)

(52) U.S. Cl.
CPC ............... *H04L 5/14* (2013.01); *H04B 7/12* (2013.01)

(58) Field of Classification Search
CPC ..................................... H04L 5/14; H04B 7/12
USPC ....................................................... 370/277
See application file for complete search history.

(56) References Cited

U.S. PATENT DOCUMENTS

| 10,045,334 | B2 | 8/2018 | Xu et al. |
| 2011/0103324 | A1* | 5/2011 | Nam ............... H04L 5/0048 370/329 |
| 2017/0223686 | A1* | 8/2017 | You ........................ H04L 5/005 |
| 2018/0115357 | A1* | 4/2018 | Park ........................ H04L 25/00 |

(Continued)

FOREIGN PATENT DOCUMENTS

| CN | 103650446 A | 3/2014 |
| CN | 109150387 A | 1/2019 |

(Continued)

OTHER PUBLICATIONS

International Search Report and Written Opinion—PCT/US2021/030304—ISA/EPO—Aug. 19, 2021.

*Primary Examiner* — Xuan Lu
(74) *Attorney, Agent, or Firm* — Paul M. McAdams; Shumaker & Sieffert, PA

(57) ABSTRACT

Aspects described herein relate to receiving, over downlink resources allocated in one or more symbols used for full-duplex communications, a first set of resource blocks having a first reference signal configuration that is different in at least one of uniformity or density, in frequency, of resource elements indicated for receiving a reference signal than a second reference signal configuration. At least a first number of resource elements in the first set of resource blocks can be calculated based on the first reference signal configuration, which can facilitate determination of transport block size for decoding downlink communications. Another aspect relates to transmitting according to the first reference signal configuration and/or second reference signal configuration.

27 Claims, 7 Drawing Sheets

(56) References Cited

U.S. PATENT DOCUMENTS

| | | | | |
|---|---|---|---|---|
| 2018/0278395 | A1* | 9/2018 | Yoon | H04L 5/0051 |
| 2020/0008228 | A1* | 1/2020 | Lee | H04L 27/261 |
| 2020/0021410 | A1* | 1/2020 | Choi | H04L 5/0007 |
| 2020/0092061 | A1 | 3/2020 | Wang et al. | |
| 2020/0119881 | A1* | 4/2020 | Xia | H04L 1/00 |
| 2021/0135789 | A1* | 5/2021 | Wu | H04L 1/0606 |
| 2021/0160117 | A1* | 5/2021 | Xiong | H04L 27/2602 |
| 2021/0194652 | A1* | 6/2021 | Khoryaev | H04L 5/0051 |

FOREIGN PATENT DOCUMENTS

| | | |
|---|---|---|
| CN | 110447201 A | 11/2019 |
| RU | 2667386 C2 | 9/2018 |
| WO | 2016130896 A1 | 8/2016 |

* cited by examiner

TECHNIQUES FOR FULL-DUPLEX COMMUNICATIONS BASED ON A REFERENCE SIGNAL CONFIGURATION

CLAIM OF PRIORITY UNDER 35 U.S.C. § 119

The present application for patent claims priority to Provisional Patent Application No. 63/019,039, entitled "TECHNIQUES FOR FULL-DUPLEX COMMUNICATIONS BASED ON A REFERENCE SIGNAL CONFIGURATION" filed May 1, 2020, which is assigned to the assignee hereof and hereby expressly incorporated by reference herein for all purposes.

BACKGROUND

Aspects of the present disclosure relate generally to wireless communication systems, and more particularly, to configuring full-duplex communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, devices, such as base stations, user equipment (UE), etc., can communicate in full-duplex such to receive and transmit communications in a same time period. Full-duplex communication modes may include a full-duplex base station communicating with one or more UEs, a full-duplex base station communicating with one or more full-duplex UEs, a full-duplex UE communicating with a base station (or multiple transmission/reception points (TRPs)), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled (e.g., communicatively, operationally, electrically, electronically, or otherwise) with the memory and the transceiver. The one or more processors are configured to receive, over downlink resources allocated in one or more symbols used for full-duplex communications, a first set of resource blocks having a first reference signal configuration that is different in at least one of uniformity or density, in frequency, of resource elements indicated for receiving a reference signal than a second reference signal configuration, calculate, based on the first reference signal configuration, at least a first number of resource elements in the first set of resource blocks, and decode, according to a transport block size that is based at least in part on at least the first number of resource elements, a downlink communication received in the downlink resources.

In another example, an apparatus for wireless communication is provided that includes a transceiver, a memory configured to store instructions, and one or more processors communicatively coupled (e.g., communicatively, operationally, electrically, electronically, or otherwise) with the memory and the transceiver. The one or more processors are configured to determine, for downlink resources allocated in one or more symbols used for full-duplex communications, a first reference signal configuration for a first set of resource blocks, wherein the first reference signal configuration is different in at least one of uniformity or density, in frequency, of resource elements indicated for transmitting a reference signal than a second reference signal configuration, and transmit, to a user equipment (UE) and based on the first reference signal configuration, downlink communications over the first set of resource blocks.

In a further example, a method for wireless communications is provided that includes receiving, over downlink resources allocated in one or more symbols used for full-duplex communications, a first set of resource blocks having a first reference signal configuration that is different in at least one of uniformity or density, in frequency, of resource elements indicated for receiving a reference signal than a second reference signal configuration, calculating, based on the first reference signal configuration, at least a first number of resource elements in the first set of resource blocks, and decoding, according to a transport block size that is based at least in part on at least the first number of resource elements, a downlink communication received in the downlink resources.

In yet another example, a method for wireless communications is provided that includes determining, for downlink resources allocated in one or more symbols used for full-duplex communications, a first reference signal configuration for a first set of resource blocks, wherein the first reference signal configuration is different in at least one of uniformity or density, in frequency, of resource elements indicated for transmitting a reference signal than a second reference signal configuration, and transmitting, to a UE and based on the first reference signal configuration, downlink communications over the first set of resource blocks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
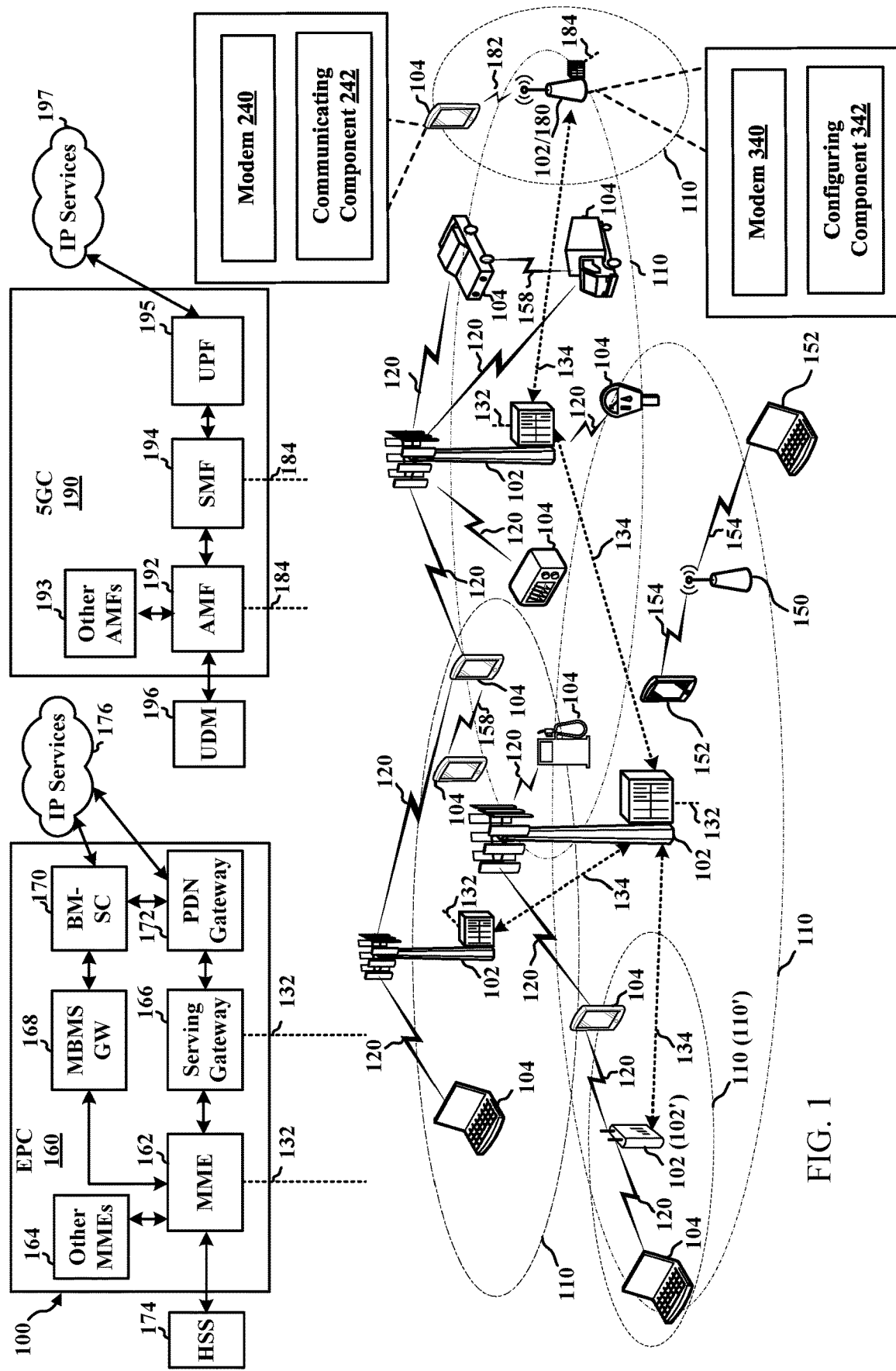
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to full-duplex (FD) wireless communications based on reference signal (RS) configuration. In an example, at least for time periods where FD wireless communications are supported or configured, RSs can be differently configured than time periods where FD wireless communications may not be supported. For example, the RSs can correspond to demodulation reference signal (DMRS), common reference signal (CRS), channel state information reference signal (CSI-RS), etc. In an example, a base station can transmit the RSs along with data (e.g., physical downlink shared channel (PDSCH)) over the frequency resources and based on a RS configuration, and a user equipment (UE) can determine a transport block size (TBS) based on the RS configuration. For example, to determine the TBS, the UE can determine a number of resource elements (REs), in the frequency resources of the channel, that are for data. In one example, the UE can determine the data REs based on determining the REs indicated for transmitting the RS based on the RS configuration. The UE can determine RS REs differently for RSs that are transmitted in periods of FD communications based on the different RS configuration.

For example, FD communications can include a base station transmitting shared channel (e.g., PDSCH), control channel (e.g., physical downlink control channel (PDCCH)), demodulation reference signal (DMRS), etc. to a user equipment (UE) while the UE is transmitting shared channel (e.g., physical uplink shared channel (PUSCH)), control channel (e.g., physical uplink control channel (PUCCH)), DMRS, etc. to the base station or another base station or other signals or corresponding channels to other devices, etc. in the same time period. In an example, a time period or time division can include one or more symbols (e.g., one or more orthogonal frequency division multiplexing (OFDM) symbols, single carrier frequency division multiplexing (SC-FDM) symbols, etc.), a slot of multiple symbols, a subframe of multiple slots, etc. For example, the devices can use frequency resources (e.g., sets of subcarriers) over the same time period to facilitate FD communications. In an example, the frequency resources over the same time period can include sets of REs (e.g., subcarriers over the time period or portion thereof, such as a symbol), sets of RBs (e.g., where each RB can include a collection of REs), etc. In an example, FD communication modes may include a FD base station communicating with one or more UEs, a FD base station communicating with one or more FD UEs, a FD UE communicating with a base station (or multiple transmission/reception points (TRPs)), etc. Devices capable of FD communications may experience self-interference caused by transmitting signals while receiving signals in the same time period.

In one example, FD communications can include in-band full duplex (IBFD) where the single node can transmit and receive on the same time and frequency resource, and the downlink and uplink can share the same IBFD time/frequency resources (e.g., full and/or partial overlap). In another example, FD communications can include sub-band FD (also referred to as "flexible duplex") where the single node can transmit and receive at the same time but on different frequency resources within the same frequency band (or over communication resources in the same CC), where the downlink resource and the uplink resources can be separated in the frequency domain (e.g., by a guard band). For example, the guard band in sub-band FD can be on the order of resource block (RB) widths (e.g., 180 kilohertz (KHz) for third generation partnership project (3GPP) long term evolution (LTE) and fifth generation (5G) new radio (NR), 360 and 720 KHz for NR, etc.). This can be distinguished from a guard band in frequency division duplexing (FDD) communications defined in LTE and NR, which can be 5 megahertz (MHz) or more, and the associated resources in FDD are defined between frequency bands, but not within the same frequency band (or resources in the same CC) as is the case in sub-band FD communications.

In some examples of FD communications, various antenna configurations can be used within a device (e.g., an access point or UE) to facilitate FD communications and mitigate self-interference. In one configuration, a transmit antenna array can be spatially separated from a receive antenna array within the device to provide improved isolation and reduce leakage (e.g., self-interference) from the transmit antenna array into the receive antenna array. For example, different antenna panels can be used at a base station (e.g., to provide >50 decibel (dB) isolation) where a first panel can be configured for downlink transmission at both edges of a frequency band, and a second panel can be configured for uplink reception in the middle of the frequency band. In another example, in sub-band FD (e.g., to provide >40 dB isolation), downlink (DL) and uplink (UL)

are in different portion of the band with guard band in between. Receiver weighted overlap add (Rx-WOLA) can be used to reduce the adjacent channel leakage ratio (ACLR) leakage to UL signal. Analog low pass filter (LPF) can be used to improve analog to digital conversion (ADC) dynamic range. In addition, for example, receiver automatic gain control (Rx-AGC) states can be improved to improve the noise floor (NF). In another example, digital interference cancellation (IC) of the ACLR leakage can be used (e.g., to provide >20 dB isolation). Non-linear model can be used per each Tx-Rx pair, in one example.

At least in sub-band FD communications, time periods configured for sub-band FD communications can have different RS formats than time periods not configured for FD communications. For example, for a time period configured for transmitting a RS while communications are also being received, the RS configuration can be different than other RS configurations in at least one of uniformity or density of REs indicated for transmitting the RS throughout a set of frequency resources defined for the channel. In one example, the different RS configuration can indicate REs for transmitting the RS such that frequency resources that are closer in frequency to frequency resources for receiving communications can have more REs dedicated to transmitting the RS (e.g., a more dense allocation of REs for transmitting the RS) or may have a non-uniform allocation of REs to improve likelihood that the RS is received by one or more devices in such time periods (e.g., despite the one or more devices transmitting communications during the time periods). Aspects described herein relate to determining TBS during such time periods to account for possible different configurations of REs for transmitting the RS. In particular, at least for time periods having FD communications, the number of REs per physical RB (PRB) can be determined based on the different RS configuration and then used to determine the TBS. This can facilitate proper TBS computation depending on whether a time period is used for FD communications or not.

The described features will be presented in more detail below with reference to FIGS. 1-7.

As used in this application, the terms "component," "module," "system" and the like are intended to include a computer-related entity, such as but not limited to hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining REs configured for a RS and/or computing an associated TBS, in accordance with aspects described herein. In addition, some nodes may have a modem 340 and configuring component 342 for configuring a device for determining REs configured for a RS, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can determine a different RS configuration for receiving downlink RSs from a base station 102 at least for time periods configured for FD communications. The different RS configuration can be different at least in uniformity or density of REs used for transmitting, by the base station 102, the RS than that used in time periods not configured for FD communications. In one example, the different RS configuration can be different at least in a set of RBs that are closer in frequency to the frequency resources configured for uplink communications to improve signal quality of the downlink RS in such time periods (and thus improve demodulation results where the RS is a DMRS, etc.). In any case, communicating component 242 can receive signals over the frequency resources and can process the signals based on the RS configuration. In one example, communicating component 242 can determine a number of RS REs of the frequency resources that are defined for transmitting the RS, and can determine the TBS based at least on the REs that are not defined for transmitting the RS. Where the frequency resources include two or more sets of frequency resources having different RS configuration, communicating component 242 can separately compute the data REs that do not include the RS REs for each set, and then determine the TBS based on the various computed data REs.

Figure 2:
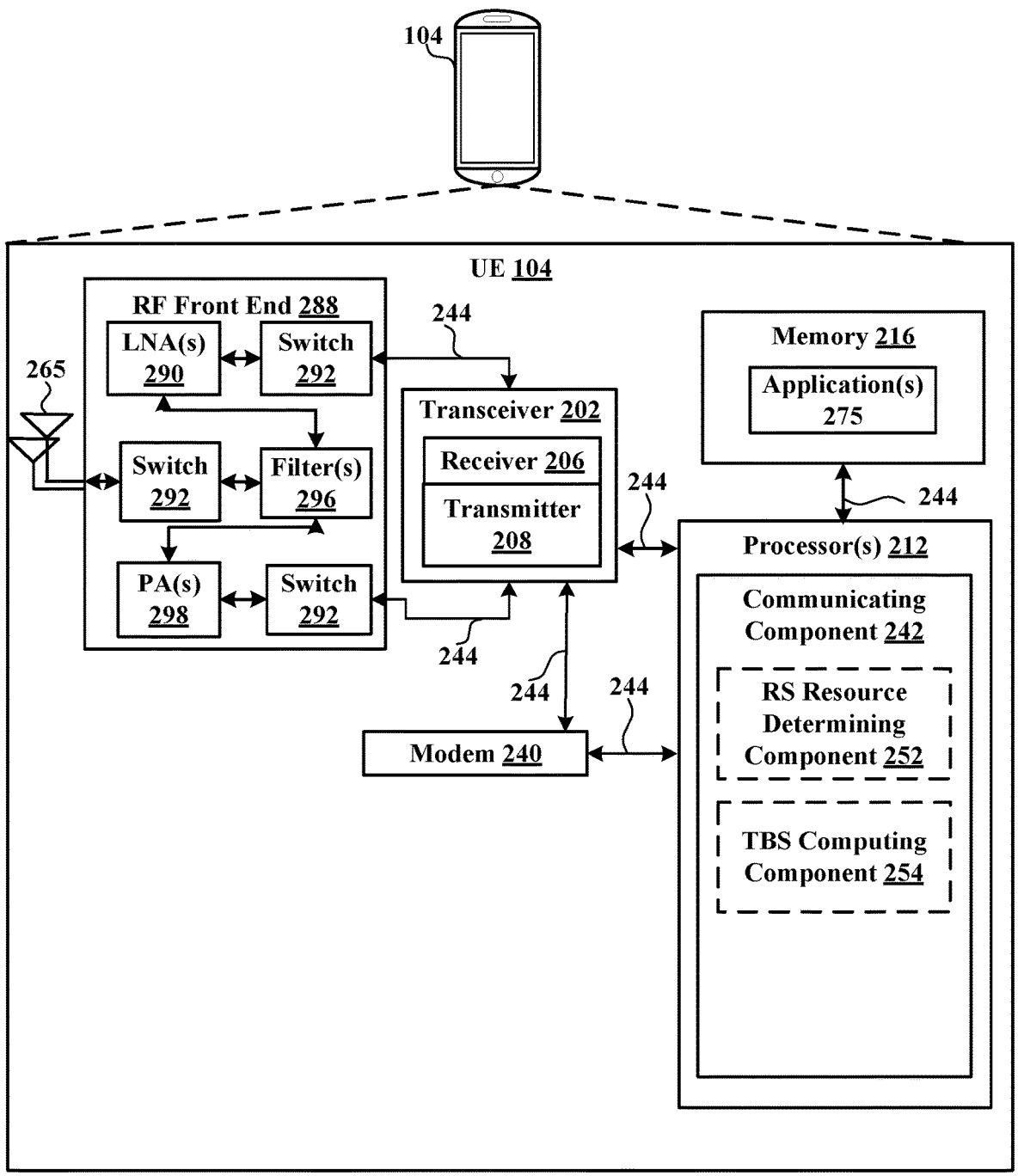
FIG. 2 is a block diagram illustrating an example of a UE, in accordance with various aspects of the present disclosure.
Figure 3:
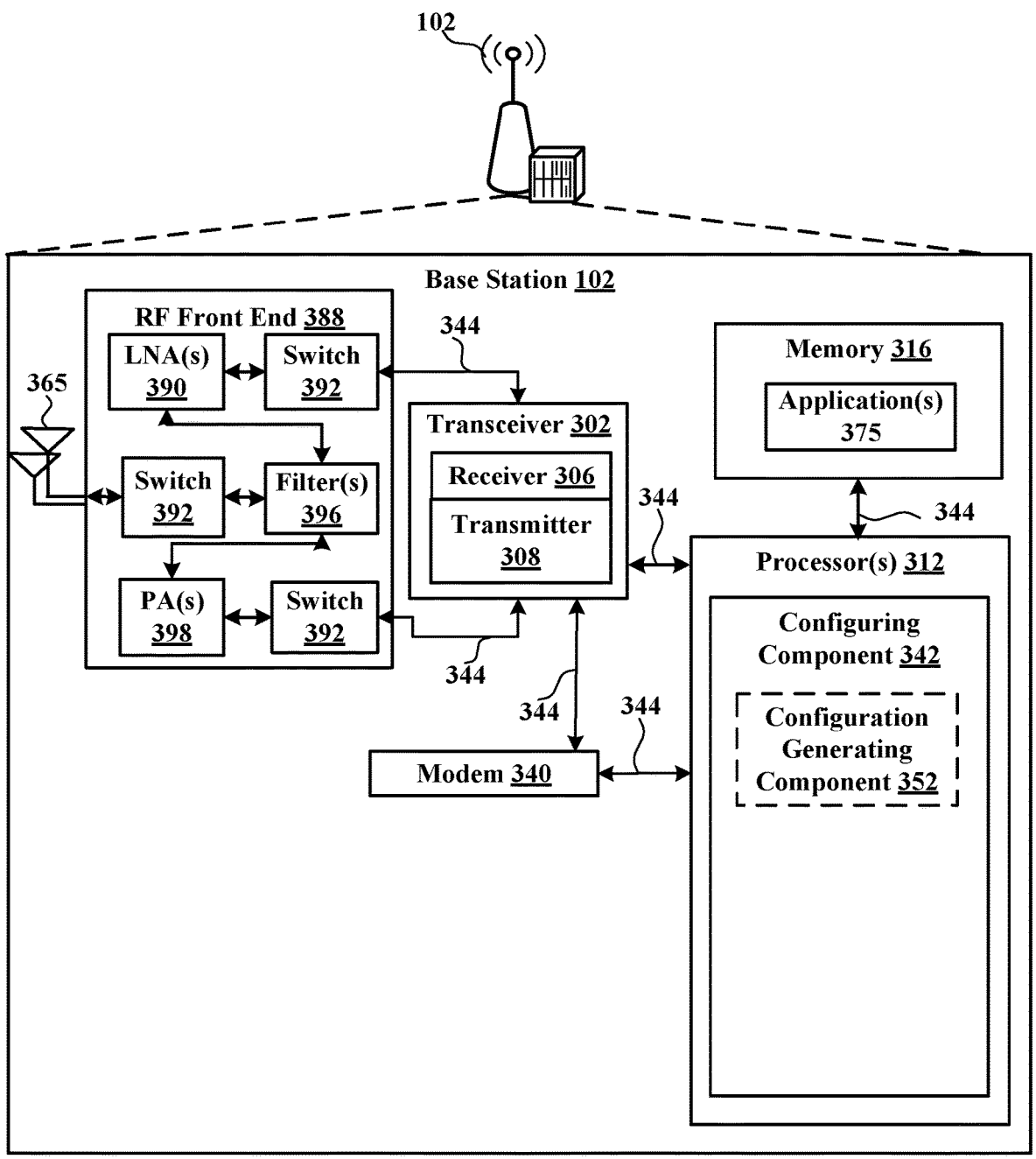
FIG. 3 is a block diagram illustrating an example of a base station, in accordance with various aspects of the present disclosure.
Figure 4:
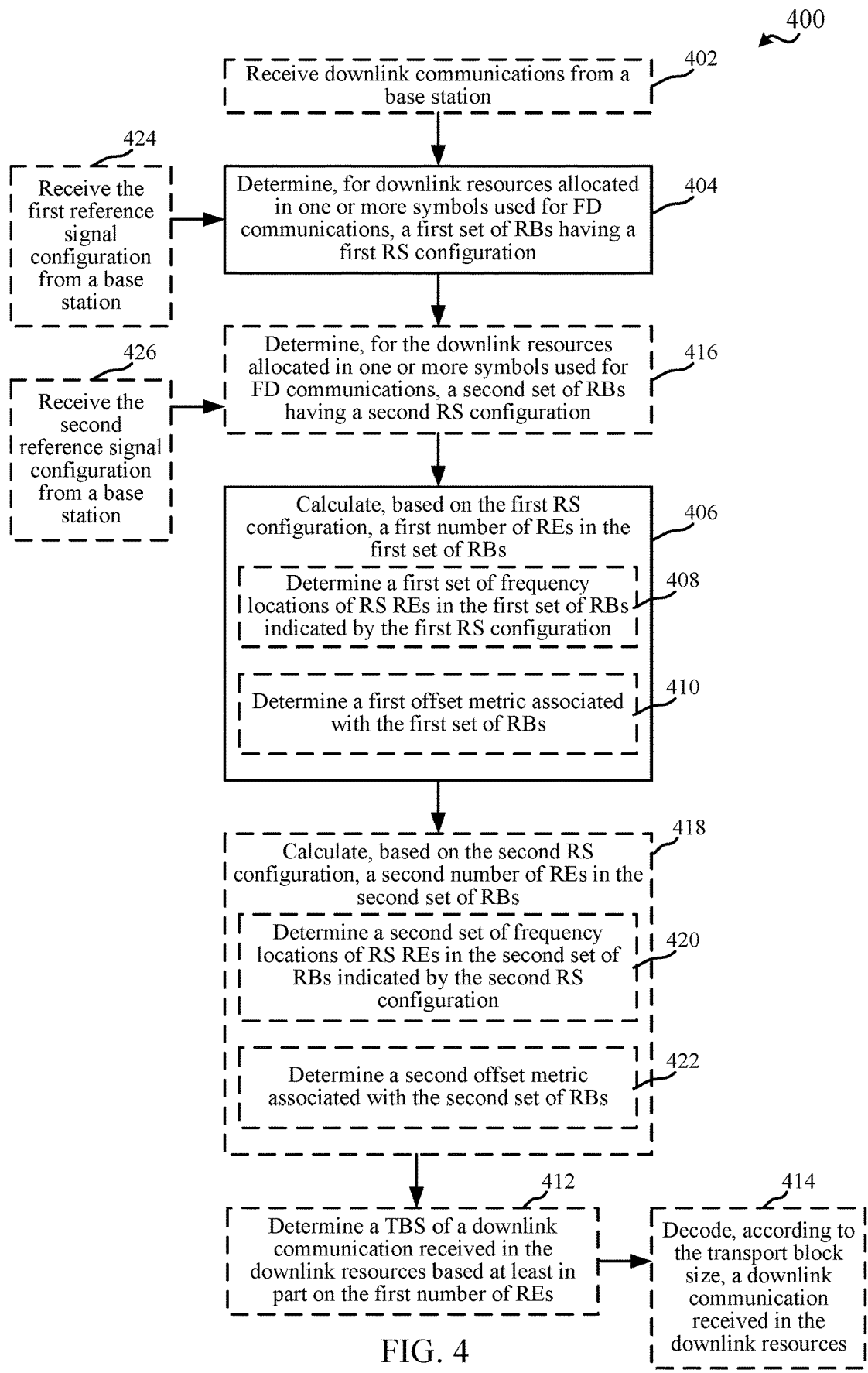
FIG. 4 is a flow chart illustrating an example of a method for determining a number of resource elements based on a reference signal configuration to compute a transport block size, in accordance with various aspects of the present disclosure.
Figure 5:
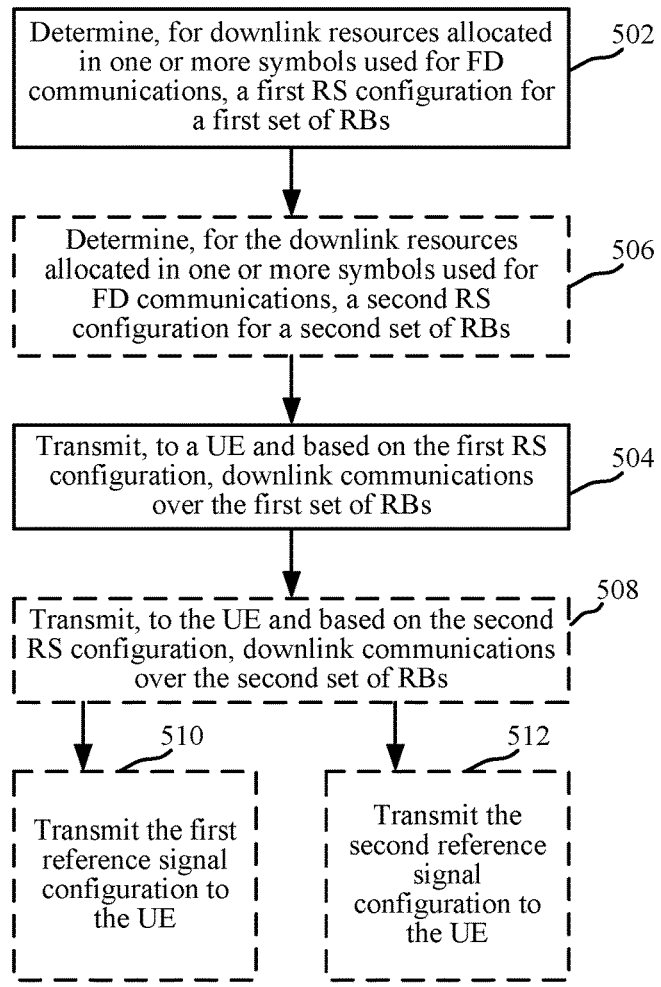
FIG. 5 is a flow chart illustrating an example of a method for transmitting downlink communications based on a reference signal configuration, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining REs configured for a RS and/or computing an associated TBS, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a RS resource determining component 252 for determining a RS configuration for a set of frequency resources, and/or a TBS computing component 254 for computing a TBS based on determining a number of REs based on the RS configuration, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device for determining REs configured for a RS, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a configuration generating component 352 for generating a RS configuration based on which to transmit RSs, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for determining a TBS for downlink communications received in a time period configured for FD communications based on an associated RS configuration, in accordance with aspects described herein. In an example, a UE 104 can perform the functions described in method 400 using one or more of the components described in FIGS. 1 and 2.

In method 400, optionally at Block 402, downlink communications can be received from a base station. In an aspect, communicating component 242, e.g., in conjunction with processor(s) 212, memory 216, transceiver 202, etc., can receive downlink communications from the base station. For example, communicating component 242 can receive downlink communications in scheduled resources, which may include portions of frequency over periods of time. As described, the portions of frequency can include subcarriers and the periods of time can include symbols (e.g., OFDM or SC-FDM symbols), slots of multiple symbols, subframes or other collections of multiple slots, etc. Frequency and time resources can include RBs (e.g., where a RB can include multiple subcarriers (e.g., 12 consecutive subcarriers) over a symbol), REs (e.g., where a RB can include multiple REs), etc. The downlink communications from the base station can include control channel (e.g., physical downlink control channel (PDCCH)) or data channel (e.g., physical downlink shared channel (PDSCH)) communications, RSs (e.g., DMRS to facilitate demodulating PDCCH or PDSCH, CRS, downlink channel state information reference signal (CSI-RS)), etc.

In an example, communicating component 242 can receive, over downlink resources allocated in one or more symbols used for full-duplex communications, a first set of resource blocks having a first reference signal configuration that is different in at least one of uniformity or density, in frequency, of resource elements indicated for receiving a reference signal than a second reference signal configuration. In addition, for example, communicating component 242 can receive, over the downlink resources allocated in the one or more symbols, a second set of resource blocks having the second reference signal configuration that is different from the first reference signal configuration.

Figure 6:
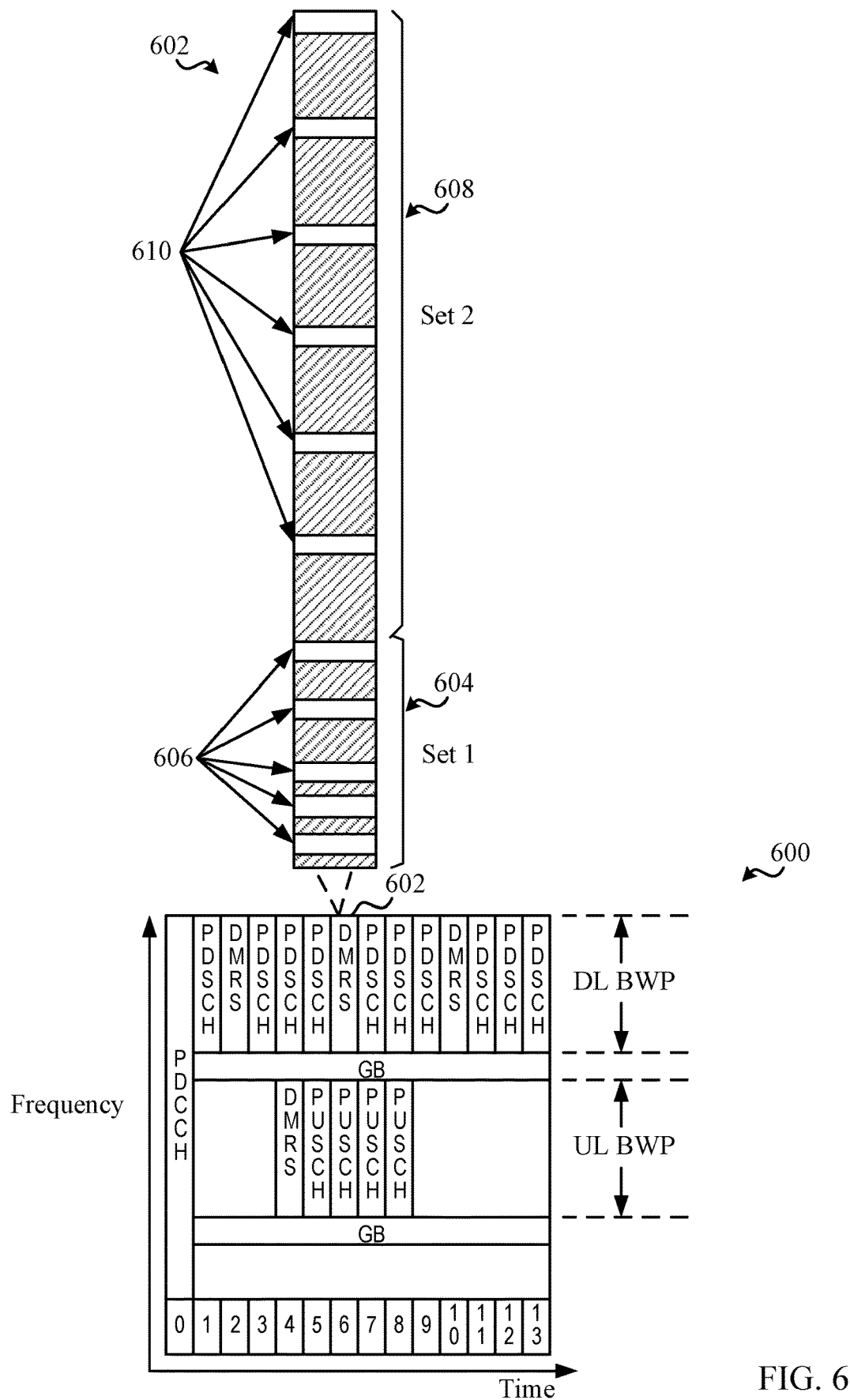
FIG. 6 illustrates an example of a resource allocation of frequency resources in a symbol having varying distributions of reference signal resource elements, in accordance with various aspects of the present disclosure.

An example is shown in FIG. 6, which illustrates a resource allocation for FD communications having a downlink (DL) bandwidth part (BWP) over symbols 0-13. In symbol 0, PDCCH is scheduled, which can include scheduling information for the remaining symbols. Symbols 1-13 can include PDSCH resources scheduled in the DL BWP along with DMRS. In addition, resource allocation 600 includes an uplink (UL) BWP within which uplink data channel (e.g., physical uplink shared channel (PUSCH)) resources are scheduled along with DMRS, in symbols 4-8. The DL BWP and UL BWP are shown as separated by a guard band in frequency. Communicating component 242 can receive downlink communications according to this or other configured resource allocations.

In method 400, at Block 404, a first set of RBs having a first RS configuration can be determined for downlink resources allocated in one or more symbols used for FD communications. In an aspect, RS resource determining component 252, e.g., in conjunction with processor(s) 212, memory 216, transceiver 202, communicating component 242, etc., can determine, for the downlink resources allocated in the one or more symbols used for FD communications, the first set of RBs having the first RS configuration. For example, RS resource determining component 252 can determine the first RS configuration for symbols used for FD communications (e.g., symbol 6 in resource allocation 600 in FIG. 6) to be different from a second RS configuration. For example, the second RS configuration can be a legacy RS configuration and/or a RS configuration used for symbols not configured for FD communications (e.g., symbols 2 and 10 in resource allocation 600 in FIG. 6).

For example, the first RS configuration can be different from the second RS configuration in at least one of uniformity or density of REs indicated for transmitting the RS within the frequency resources. In one example, the first RS configuration can have a greater density of REs than the second RS configuration at least in a first portion of the frequency resources that are closer, in frequency, to the frequency resources scheduled for uplink communications in the symbol. An example is shown in FIG. 6, which illustrates symbol 602 used for DMRS transmission where the symbol can include a first set of frequency resources 604 having a more dense distribution of REs 606 used for DMRS than REs 610 in a second set of frequency resources 608. In addition, for example, at least the REs 606 can have a non-uniform distribution in frequency. For example, more dense distribution of REs used for DMRS can refer to having a larger ratio of number of REs used for DMRS to number of REs in the set of frequency resources. In another example, similar configurations of REs may also apply for downlink CSI-RS (e.g., a first RS configuration with a greater density of REs than a second RS configuration for CSI-RS). In one example, a second RS configuration (e.g., an RS configuration for an RS that is not in a time period having frequency resources scheduled for uplink communications, such as the RS in symbols 2 and 10) may have at least one of a substantially uniform or less dense distribution of REs within the frequency resources. In one example, the second set of REs 610 in the first RS configuration may be defined according to, or similarly as, the second RS configuration (e.g. a legacy RS configuration), such that the first set of REs 606 in this specific example are modified based on proximity, in frequency, to the UL BWP.

In method 400, at Block 406, a first number of REs in the first set of RBs can be calculated based on the first RS configuration. In an aspect, RS resource determining component 252, e.g., in conjunction with processor(s) 212, memory 216, transceiver 202, communicating component 242, etc., can calculate, based on the first RS configuration, the first number of REs (e.g., REs used for data) in the first set of RBs. For example, in calculating the first number of REs at Block 406, optionally at Block 408, a first set of frequency locations of RS REs in the first set of RBs indicated by the first RS configuration can be determined. In an aspect, RS resource determining component 252, e.g., in conjunction with processor(s) 212, memory 216, transceiver 202, communicating component 242, etc., can determine the first set of frequency locations of RS REs in the first set of RBs indicated by the first RS configuration. In another example, in calculating the first number of REs at Block 406, optionally at Block 410, a first offset metric associated with the first set of RBs can be determined. In an aspect, RS resource determining component 252, e.g., in conjunction with processor(s) 212, memory 216, transceiver 202, communicating component 242, etc., can determine the first offset metric associated with the first set of RBs. For example, the offset metric can be configured by higher layer signaling (e.g., radio resource control (RRC) signaling) from the base station, and can also be used in calculating the first number of REs.

For example, for a uniform distribution of REs assigned for transmitting RS (also referred to herein as RS REs), some radio access technologies (RATs), such as 5G NR, define that the number of REs ($N'_{RE}$) allocated for PDSCH within a PRB is computed based on the following:

$$N'_{RE} = N_{SC}^{RB} \cdot N_{symb}^{sh} - N_{DMRS}^{PRB} - N_{oh}^{PRB}$$

where $N_{SC}^{RB}=12$ is the number of subcarriers in a PRB, $N_{symb}^{sh}$ is the number of scheduled OFDM symbols in a slot, $N_{DMRS}^{PRB}$ is the number of REs for DMRS per PRB in the scheduled duration including overhead of DMRS code division multiplexing (CDM) groups indicated by downlink control information (DCI) format 1_0/1_1, and $N_{oh}^{PRB}$ is overhead configured by a higher layer parameter (e.g., RRC parameter Xoh-PDSCH, configured as 0, 6, 12, or 18), or zero if not configured. In one example, where the RS REs indicated in the first RS configuration for transmitting the RS are uniform (e.g., where the first RS configuration indicates a period or other regular interval for determining the REs, etc.), RS resource determining component 252 can determine the number of REs using a similar formula. For example, RS resource determining component 252 can determine the number of REs based on the following:

$$N'_{RE} = N_{SC}^{RB} \cdot N_{symb}^{sh} - N_{DMRS\_fd}^{PRB} - N_{oh\_fd}^{PRB}$$

where $N_{DMRS\_fd}^{PRB}$ is the number of REs for DMRS per PRB in symbols that are configured for FD communications in the scheduled duration of including overhead of DMRS CDM groups indicated by DCI format 1_0/1_1, and $N_{oh\_fd}^{PRB}$ is overhead configured by a higher layer parameter (e.g., RRC parameter Xoh-PDSCH, configured as 0, 6, 12, or 18), or zero if not configured, in symbols that are configured for FD communications. The overhead metric $N_{oh\_fd}^{PRB}$ can account for CSI-RS and control resource set (CORESET) design for the first set of RBs. Additionally, RS resource determining component 252 can determine at least one of $N_{DMRS\_fd}^{PRB}$ or $N_{oh\_fd}^{PRB}$ in a configuration received from the base station 102 (e.g., in RRC signaling).

In addition, for example, in determining the first number of REs, RS resource determining component 252 can quantize the number of REs allocated for PDSCH within a PRB. In an example, RS resource determining component 252 can determine the quantized number $\overline{N}'_{RE}$ as defined in 5G NR based on the Table below.

| $N'_{RE}$ | $\overline{N}'_{RE}$ |
|---|---|
| ≤9 | 6 |
| 9 < $N'_{RE}$ ≤ 15 | 12 |
| 15 < $N'_{RE}$ ≤ 30 | 18 |
| 30 < $N'_{RE}$ ≤ 57 | 42 |
| 57 < $N'_{RE}$ ≤ 90 | 72 |
| 90 < $N'_{RE}$ ≤ 126 | 108 |
| 126 < $N'_{RE}$ ≤ 150 | 144 |
| 150 < $N'_{RE}$ | 156 |

In another example, RS resource determining component 252 can quantize the number of REs in symbols configured for FD communications based on a different table, function, or other determination.

In another example, where the RS REs indicated in the first RS configuration for transmitting the RS are not uniform, RS resource determining component 252 can determine the first number of REs based on determining the number of allocated PRBs and the exact location, in frequency, of the PRBs. For example, RS resource determining component 252 can determine location, in frequency (also referred to herein as "frequency location") of the RS REs within the first set of RBs, which can be based on the first RS configuration that indicates frequency location of the RS REs. For example, the first RS configuration can indicate the non-uniform distribution by specifying frequency locations, different periods for different portions of RBs, etc. RS resource determining component 252 can determine frequency location of the RS REs within the first set of RBs based on this information and then can determine the REs not indicated for transmitting RSs to determine the first number of REs. In another example, the first RS configuration, or another configuration, can indicate the frequency location and/or size of PRBs or corresponding REs used for data. As described further herein, the first RS configuration or other configurations can be known by the UE 104 (e.g., stored in memory 216) or otherwise received in signaling from the base station 102.

In method 400, optionally at Block 412, a TBS of a downlink communication received in the downlink resources can be determined based at least in part on the first number of REs. In an aspect, TBS computing component 254, e.g., in conjunction with processor(s) 212, memory 216, transceiver 202, communicating component 242, etc., can determine the TBS of the downlink communication received in the downlink resources based at least in part on the first number of REs. In 5G NR, for example, the total number of REs allocated for PDSCH ($N_{RE}$) can be determined by $N_{RE} = \overline{N}'_{RE} \cdot n_{PRB}$, where $n_{PRB}$ is the total number of allocated PRBs for the UE. In addition, based on an intermediate number of information bits ($N_{info}$) is obtained by $N_{info} = N_{RE} \cdot R \cdot Q_m \cdot \upsilon$, where R and $Q_m$ are determined from the modulation and coding scheme (MCS) field for the downlink communications and $\upsilon$ corresponds to the number of PDSCH layers. If $N_{info} \leq 3824$, the TBS can be determined based on quantizing $N_{info}$ as:

$$N'_{info} = \max\left(24, 2^n \cdot \left\lfloor \frac{N_{info}}{2^n} \right\rfloor\right)$$

where $n = \max(3, \lfloor \log_2(N_{info}) \rfloor - 6)$. The TBS can be determined from the below table that is not less than $N'_{info}$.

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |

-continued

| Index | TBS |
| --- | --- |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info} > 3824$, the TBS can be determined based on quantizing $N_{info}$ as:

$$N'_{info} = 2^n \cdot \text{round}\left(\frac{N_{info} - 24}{2^n}\right)$$

where $n = \lfloor \log_2(N_{info} - 24) \rfloor - 5$ and where ties in the round function are broken towards the next largest integer. In addition, in this example, if $R \leq \frac{1}{4}$, the TBS can be determined as:

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil.$$

Otherwise, if $R > \frac{1}{4}$ and $N'_{info} > 8424$:

$$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil.$$

Otherwise, if $R > \frac{1}{4}$ and $N'_{info} \leq 8424$:

$$TBS = 8 \cdot \left\lceil \frac{N'_{info} + 24}{8 \cdot C} \right\rceil - 24.$$

In an example, TBS computing component 254 can determine the TBS of the downlink communication received in the downlink resources based at least in part on the first number of REs calculated by RS resource determining component 252, as described above. For example, TBS computing component 254 can determine the TBS of the downlink communication received in the downlink resources based at least in part on the first number of REs determined for symbols over which FD communications are configured.

In one example, the frequency resources for transmitting RSs in symbols used for FD communications can be split into multiple portions, where each portion can have a RS configuration. The RS configuration for each portion can be the same or different from another portion. Referring to FIG. 6, the frequency resources can be split into a first portion (set 1 604) and a second portion (set 2 608). In the first portion, in this specific example, REs 606 used for transmitting the RS can be non-uniformly distributed such that REs closer to the UL BWP can be more dense than those further from the UL BWP. In addition, for example, the REs 606 can be more dense than REs 610 of the second portion. Moreover, for example, the REs 610 in the second portion may be uniformly distributed and/or may be allocated according to a legacy RS configuration. In any case, for example, RS resource determining component 252 can determine the number of REs for each portion, and TBS computing component 254 can compute the TBS based on the number of REs in the first portion and the number of REs in the second portion.

In method 400, optionally at Block 414 a downlink communication received in the downlink resources can be decoded according to the TBS. In an aspect, communicating component 242, e.g., in conjunction with processor(s) 212, memory 216, transceiver 202, etc., can decode, according to the TBS, the downlink communication received in the downlink resources. For example, communicating component 242 can use the transport block size to determine where the codeblock starts and where it ends such that the decoding process is successful. Any misalignment in the true transport block size may result in failure, and as such, communicating component 242 can match the code block size from the TBS.

In method 400, optionally at Block 416 (e.g., where the frequency resources are split into multiple portions), a second set of RBs having a second RS configuration can be determined for downlink resources allocated in one or more symbols used for FD communications. In an aspect, RS resource determining component 252, e.g., in conjunction with processor(s) 212, memory 216, transceiver 202, communicating component 242, etc., can determine, for the downlink resources allocated in the one or more symbols used for FD communications, the second set of RBs having the second RS configuration. For example, RS resource determining component 252 can determine the second RS configuration used for the second set of RBs in symbols used for FD communications (e.g., symbol 6 in resource allocation 600 in FIG. 6) to be different from the first RS configuration used for the first set of RBs.

For example, the first RS configuration can be different from the second RS configuration in at least one of uniformity or density of REs indicated for transmitting the RS within the frequency resources, as described. In one example, the first RS configuration can have a greater density of REs than the second RS configuration at least in a first portion of the frequency resources that are closer in frequency to the frequency resources scheduled for uplink communications in the symbol. An example is shown and described in FIG. 6 above.

In this example, in method 400, optionally at Block 418, a second number of REs in the second set of RBs can be calculated based on the second RS configuration. In an aspect, RS resource determining component 252, e.g., in conjunction with processor(s) 212, memory 216, transceiver 202, communicating component 242, etc., can calculate, based on the second RS configuration, the second number of REs (e.g., REs used for data) in the second set of RBs. For example, in calculating the second number of REs at Block 418, optionally at Block 420, a second set of frequency locations of RS REs in the second set of RBs indicated by the second RS configuration can be determined. In an aspect, RS resource determining component 252, e.g., in conjunction with processor(s) 212, memory 216, transceiver 202, communicating component 242, etc., can determine the second set of frequency locations of RS REs in the second set of RBs indicated by the second RS configuration. In another example, in calculating the second number of REs at Block 418, optionally at Block 422, a second offset metric associated with the second set of RBs can be determined. In an aspect, RS resource determining component 252, e.g., in conjunction with processor(s) 212, memory 216, transceiver 202, communicating component 242, etc., can determine the second offset metric associated with the second set of RBs. For example, the second offset metric can be configured by higher layer signaling (e.g., RRC signaling) from the base station, and can also be used in calculating the second number of REs.

For example, as described, where the first RS configuration indicates RS REs that are uniformly distributed in the first set of RBs, RS resource determining component 252 can compute the number of REs ($N'_{RE1}$) allocated for PDSCH within the first set of RBs, based on the following:

$$N'_{RE1} = N_{SC}^{RB} \cdot N_{symb}^{sh} - N_{DMRS\_fd}^{PRB} - N_{oh\_fd}^{PRB}$$

Similarly, for example, where the second RS configuration indicates RS REs that are uniformly distributed in the second set of RBs, RS resource determining component 252 can compute the number of REs ($N'_{RE2}$) allocated for PDSCH within the second set of RBs, based on the following:

$$N'_{RE2} = N_{SC}^{RB} \cdot N_{symb}^{sh} - N_{DMRS}^{PRB} - N_{oh}^{PRB}$$

where the above formula assumes that the $N_{DMRS}^{PRB}$ and $N_{oh}^{PRB}$ specified for the second set of RBs are the same as the values defined in 5G NR (though other values can be used and configured for the UE). RS resource determining component 252 can also quantize $N'_{RE1}$ as $\overline{N}'_{RE1}$ and $N'_{RE2}$ as $\overline{N}'_{RE2}$ based on one or more tables, as described above. In this example, RS resource determining component 252 can determine the total number of REs allocated for PDSCH, $N'_{RE}$, by $N'_{RE} = \overline{N}'_{RE1} \cdot n_{PRB1} + \overline{N}'_{RE2} \cdot n_{PRB2}$, where $n_{PRB1}$ and $n_{PRB2}$ are the total number of allocated PRBs for the UE in the first set of RBs and the second set of RBs, respectively. TBS computing component 254 can compute the TBS (e.g., as described above) based on this calculated total number of REs.

In another example, where the first RS configuration indicates RS REs that are not uniformly distributed, RS resource determining component 252 can determine the total number of REs, $N'_{RE1}$, for the first set of RBs based on the number of allocated PRBs and the frequency location of the PRBs. In addition, in this example, where the second set of RBs have a uniform distribution of RS REs, RS resource determining component 252 can compute the number of REs ($N'_{RE2}$) allocated for PDSCH within the second set of RBs, based on the following:

$$N'_{RE2} = N_{SC}^{RB} \cdot N_{symb}^{sh} - N_{DMRS}^{PRB} - N_{oh}^{PRB}$$

where the above formula assumes that the $N_{DMRS}^{PRB}$ and $N_{oh}^{PRB}$ specified for the second set of RBs are the same as the values defined in 5G NR (though other values can be used and configured for the UE). RS resource determining component 252 can also quantize $N'_{RE1}$ as $\overline{N}'_{RE1}$ and $N'_{RE2}$ as $\overline{N}'_{RE2}$ based on one or more tables, as described above. In this example, RS resource determining component 252 can determine the total number of REs allocated for PDSCH, $N'_{RE}$, by $N'_{RE} = \overline{N}'_{RE1} \cdot n_{PRB1} + \overline{N}'_{RE2} \cdot n_{PRB2}$, where $n_{PRB1}$ and $n_{PRB2}$ are the total number of allocated PRBs for the UE in the first set of RBs and the second set of RBs, respectively. TBS computing component 254 can compute the TBS (e.g., as described above) based on this calculated total number of REs.

In some examples, RS resource determining component 252 can determine the split of multiple portions (e.g., which portion of frequency corresponds to the first portion and which corresponds to the second portion) from a configuration, which may be received from the base station 102. For example, the base station can specify (e.g., via RRC signaling), the RS RE configuration for all portions (e.g., via corresponding RS configurations described above). In an example, in method 400, optionally at Block 424, the first RS configuration can be received from a base station. In an aspect, RS resource determining component 252, e.g., in conjunction with processor(s) 212, memory 216, transceiver 202, communicating component 242, etc., can receive the first RS configuration from the base station. For example, RS resource determining component 252 can receive the first configuration in RRC signaling from the base station 102. As described, for example, the first RS configuration can indicate at least frequency location information for RS REs, whether in the form of $N_{DMRS\_fd}^{PRB}$ or $N_{oh\_fd}^{PRB}$ for uniform distribution of RS REs, exact (or relative) frequency locations of the RS REs, exact (or relative) frequency locations of the data PRBs, etc., as described above, such that the number of REs for the data PRBs can be determined.

In an example, in method 400, optionally at Block 426, the second RS configuration can be received from a base station. In an aspect, RS resource determining component 252, e.g., in conjunction with processor(s) 212, memory 216, transceiver 202, communicating component 242, etc., can receive the second RS configuration from the base station. For example, RS resource determining component 252 can receive the second configuration in RRC signaling from the base station 102. As described, for example, the second RS configuration can indicate at least frequency location information for RS REs, whether in the form of $N_{DMRS}^{PBR}$ or $N_{oh}^{PRB}$ for uniform distribution of RS REs (according to current 5G NR definition), exact (or relative) frequency locations of the RS REs, exact (or relative) frequency locations of the data PRBs, etc., as described above, such that the number of REs for the data PRBs can be determined.

In addition, in an example, RS resource determining component 252 can determine to consider at least the first RS configuration (and/or the first RS configuration for the first set of RBs and the second RS configuration for the second set of RBs) based on determining that the one or more symbols are configured for FD communications. In another example, RS resource determining component 252 can determine to use different tables to quantize the number of REs, as described above, based on determining that the one or more symbols are configured for FD communications. In another example, TBS computing component 254 can determine to compute the TBS using the modified mechanisms for calculating the REs above based on determining that the one or symbols are configured for FD communications.

In addition, though described in terms of two sets of RBs and two corresponding RS configurations, the frequency resources can be split into additional portions with additional RS configurations indicated for each portion to allow the UE 104 to compute the number of REs for determining TBS, as described. Each additional portion can vary in at least one of uniformity or density of RS REs within the set of RBs, as described. Moreover, though described in terms of DMRS, similar concepts can be applied for determining the number of REs based on one or more DL CSI-RS configurations, which may apply to one or more sets of RBs and/or may indicate a distribution of CSI-RS REs that differ in at least one of uniformity or density, etc.

FIG. 5 illustrates a flow chart of an example of a method 500 for determining one or more RS configurations for transmitting an RS in one or more sets of RBs, in accordance with aspects described herein. In an example, a base station 102 can perform the functions described in method 500 using one or more of the components described in FIGS. 1 and 3.

In method 500, at Block 502, a first RS configuration for a first set of RBs, for downlink resources allocated in one or more symbols used for FD communications, can be determined. In an aspect, configuring component 342, e.g., in conjunction with processor(s) 312, memory 316, transceiver 302, etc., can determine, for downlink resources allocated in one or more symbols used for FD communications, the first RS configured for the first set of RBs. For example, configuring component 342 can determine or generate the first RS configuration as a distribution of RS REs used for transmitting a RS in frequency resources of one or more symbols, as described above, where the distribution can differ in at least one of uniformity or density from a second RS configuration (e.g., a legacy RS configuration specified in 5G NR).

In method 500, at Block 504, downlink communications can be transmitted, to a UE, and based on the first RS configuration, over the first set of RBs. In an aspect, configuring component 342, e.g., in conjunction with processor(s) 312, memory 316, transceiver 302, etc., can transmit, to the UE and based on the first RS configuration, the downlink communications over the first set of RBs. For example, configuring component 342 can transmit the downlink communications over the first set of RBs based on the first RS configuration such that the configuring component 342 transmits RSs in the RS REs and data in the remaining REs of the first set of RBs over the one or more symbols configured for FD communications.

In one example, as described above, for the one or more symbols configured for FD communications, the frequency resources may be split into multiple sets, where each set of RBs can differ in at least one of uniformity or density of RS REs, where one specific example is shown in FIG. 6. Thus, in one example in method 500, optionally at Block 506, a second RS configuration for a second set of RBs, for downlink resources allocated in one or more symbols used for FD communications, can be determined. In an aspect, configuring component 342, e.g., in conjunction with processor(s) 312, memory 316, transceiver 302, etc., can determine or generate, for downlink resources allocated in one or more symbols used for FD communications, the second RS configuration for the second set of RBs. For example, configuring component 342 can determine the second RS configuration as a distribution of RS REs used for transmitting a RS in the second set of RBs of the one or more symbols, as described above, where the distribution can differ in at least one of uniformity or density from the first RS configuration. In one example, the second RS configuration can be a legacy RS configuration specified in 5G NR, which can be substantially uniform and defined according to a number of REs for DMRS per PRB (e.g., $N_{DMRS}^{PRB}$).

In this example, in method 500, optionally at Block 508, downlink communications can be transmitted, to a UE, and based on the second RS configuration, over the second set of RBs. In an aspect, configuring component 342, e.g., in conjunction with processor(s) 312, memory 316, transceiver 302, etc., can transmit, to the UE and based on the second RS configuration, the downlink communications over the second set of RBs. For example, configuring component 342 can transmit the downlink communications over the second set of RBs based on the second RS configuration such that the configuring component 342 transmits RSs in the RS REs and data in the remaining REs of the second set of RBs.

In method 500, optionally at Block 510, the first RS configuration can be transmitted to the UE. In an aspect, configuration generating component 352, e.g., in conjunction with processor(s) 312, memory 316, transceiver 302, configuring component 342, etc., can transmit the first RS configuration to the UE. For example, configuration generating component 352 can generate the first RS configuration to indicate at least frequency location information for RS REs, whether in the form of $N_{DMRS\_fd}^{PRB}$ or $N_{oh\_fd}^{PRB}$ for uniform distribution of RS REs, exact (or relative) frequency locations of the RS REs, exact (or relative) frequency locations of the data PRBs, etc., as described above, such that the number of REs for the data PRBs can be determined. Configuration generating component 352 can transmit the first configuration to the UE (e.g., in RRC signaling) to allow the UE to determine the number of REs for the data PRBs in the first set of RBs to compute the TBS, as described above.

In method 500, optionally at Block 512 (e.g., where the base station 102 determines the second RS configuration), the second RS configuration can be transmitted to the UE. In an aspect, configuration generating component 352, e.g., in conjunction with processor(s) 312, memory 316, transceiver 302, configuring component 342, etc., can transmit the second RS configuration to the UE. For example, configuration generating component 352 can generate the second RS configuration to indicate at least frequency location information for RS REs, whether in the form of $N_{DMRS\_fd}^{PRB}$ or $N_{oh\_fd}^{PRB}$ for uniform distribution of RS REs, exact (or relative) frequency locations of the RS REs, exact (or relative) frequency locations of the data PRBs, etc., as described above, such that the number of REs for the data PRBs can be determined. Configuration generating component 352 can transmit the second configuration to the UE (e.g., in RRC signaling) to allow the UE to determine the number of REs for the data PRBs in the second set of RBs to compute the TBS, as described above.

Figure 7:
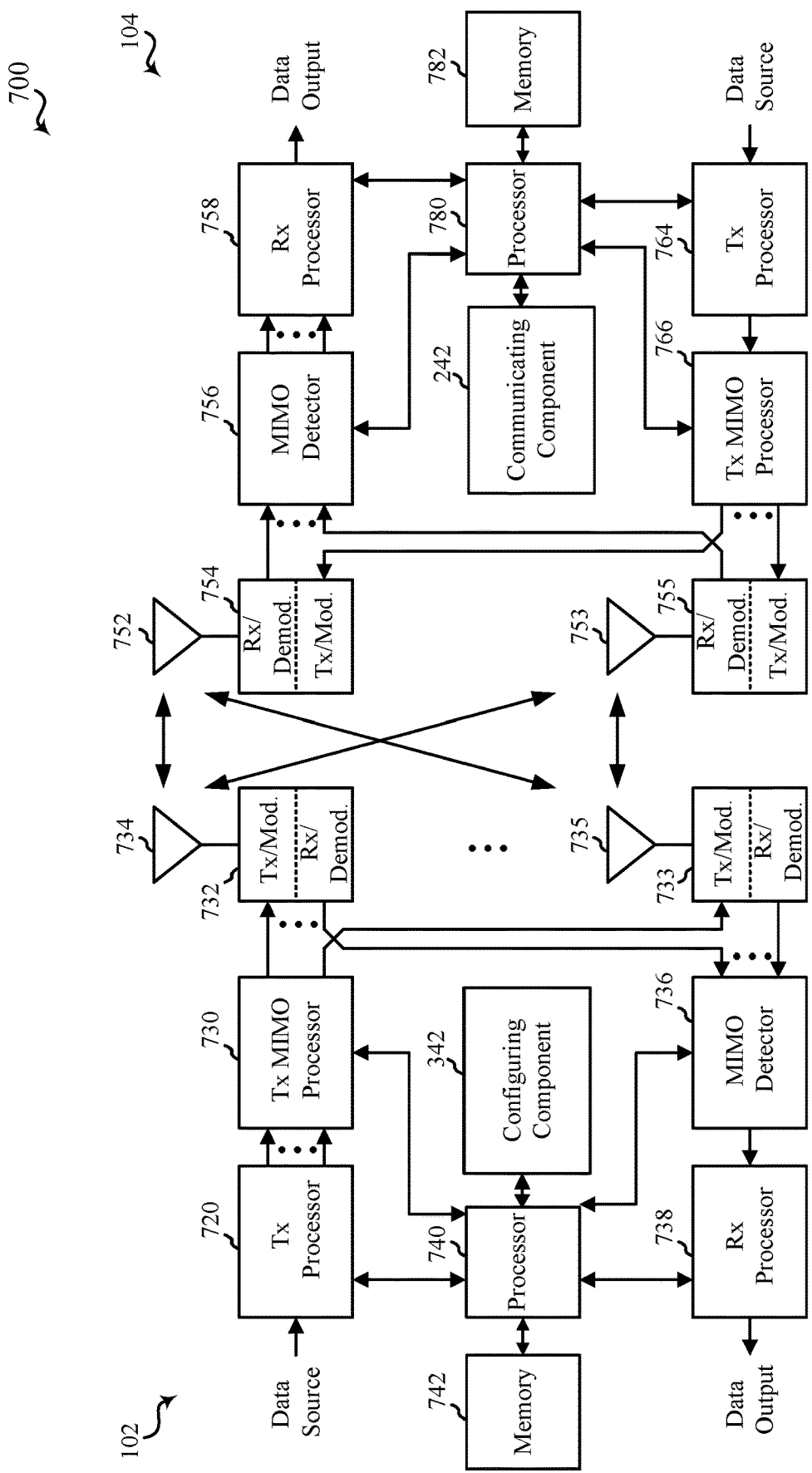
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communications including determining, for downlink resources allocated in one or more symbols used for full-duplex communications, a first set of resource blocks having a first reference signal configuration that is different in at least one of uniformity or density, in frequency, of resource elements indicated for receiving a reference signal than a second reference signal configuration, calculating, based on the first reference signal configuration, at least a first number of resource elements in the first set of resource blocks, and determining a transport block size of a downlink communication received in the downlink resources based at least in part on at least the first number of resource elements.

In Aspect 2, the method of Aspect 1 includes where the second reference signal configuration is a legacy reference signal configuration having a substantially uniform distribution, in frequency, of resource elements indicated for receiving the reference signal.

In Aspect 3, the method of any of Aspects 1 or 2 includes determining, for the downlink resources allocated in the one or more symbols, a second set of resource blocks having the second reference signal configuration that is different from the first reference signal configuration, and calculating, based on the second reference signal configuration, a second number of resource elements in the second set of resource blocks, where determining the transport block size is further based at least in part on the second number of resource elements.

In Aspect 4, the method of any of Aspects 1 to 3 includes where the first reference signal configuration indicates at least a first number of reference signal resource elements for receiving the reference signal within the first set of resource blocks.

In Aspect 5, the method of Aspect 4 includes where the first reference signal configuration indicates the first number of reference signal resource elements at least by indicating a first set of relative frequency locations within the first set of resource blocks.

In Aspect 6, the method of Aspect 5 includes where the first set of relative frequency locations indicates different relative frequency locations than a second set of relative frequency locations associated with the second reference signal configuration.

In Aspect 7, the method of any of Aspects 5 or 6 includes where the first set of relative frequency locations are more dense within the first set of resource blocks than a second set of relative frequency locations associated with the second reference signal configuration.

In Aspect 8, the method of any of Aspects 5 to 7 includes where the second reference signal configuration indicates at least a second number of reference signal resource elements for receiving the reference signal within a second set of resource blocks in the one or more symbols, where the second reference signal configuration indicates the second number of reference signal resource elements at least by indicating a second set of relative frequency locations within the second set of resource blocks, where the first set of relative frequency locations are not uniform within the first set of resource blocks, and where the second set of relative frequency locations are uniform within the second set of resource blocks.

In Aspect 9, the method of any of Aspects 5 to 8 includes where the second reference signal configuration indicates at least a second number of reference signal resource elements for receiving the reference signal within a second set of resource blocks in the one or more symbols, and where the first set of resource blocks are closer in frequency than the second set of resource blocks to a set of uplink resource blocks in the one or more symbols used for full-duplex communications.

In Aspect 10, the method of any of Aspects 4 to 9 includes where the second reference signal configuration indicates at least a second number of reference signal resource elements for receiving the reference signal within a second set of resource blocks in the one or more symbols, where calculating the first number of resources elements is based on the first number of reference signal resource elements, and further comprising calculating a second number of resources elements based on the second number of reference signal resource elements, where determining the transport block size is further based at least in part on the second number of resource elements.

In Aspect 11, the method of Aspect 10 includes where the first reference signal configuration indicates at least a first overhead metric associated with the first set of resource blocks, where the second reference signal configuration indicates at least a second overhead metric associated with the second set of resource blocks, where calculating the first number of resources elements is further based on the first overhead metric, and where calculating the second number of resources elements is further based on the second overhead metric.

In Aspect 12, the method of any of Aspects 1 to 11 includes where the second reference signal configuration indicates at least a second number of reference signal resource elements for receiving the reference signal within a second set of resource blocks in the one or more symbols, where calculating the first number of resources elements is based on determining the first number of resource elements based on a number of allocated resource blocks and location of the allocated resource blocks, and further comprising calculating a second number of resources elements is based on the second number of reference signal resource elements, where determining the transport block size is further based at least in part on the second number of resource elements.

In Aspect 13, the method of any of Aspects 1 to 12 includes receiving, from a base station, an indication of the first reference signal configuration.

Aspect 14 is a method for wireless communications including determining, for downlink resources allocated in one or more symbols used for full-duplex communications, a first reference signal configuration for a first set of resource blocks, where the first reference signal configuration is different in at least one of uniformity or density, in frequency, of resource elements indicated for transmitting a reference signal than a second reference signal configuration, and transmitting, to a UE and based on the first reference signal configuration, downlink communications over the first set of resource blocks.

In Aspect 15, the method of Aspect 14 includes where the second reference signal configuration is a legacy reference signal configuration having a substantially uniform distribution, in frequency, of resource elements indicated for transmitting the reference signal.

In Aspect 16, the method of any of Aspects 14 or 15 includes determining, for the downlink resources allocated in the one or more symbols, a second reference signal configuration for a second set of resource blocks that is different from the first reference signal configuration, and transmitting, to the UE and based on the second reference signal configuration, downlink communications over the second set of resource blocks.

In Aspect 17, the method of any of Aspects 14 to 16 includes where the first reference signal configuration indicates at least a first number of reference signal resource elements for transmitting a reference signal within the first set of resource blocks.

In Aspect 18, the method of Aspect 17 includes where the first reference signal configuration indicates the first number of reference signal resource elements at least by indicating a first set of relative frequency locations within the first set of resource blocks.

In Aspect 19, the method of Aspect 18 includes where the first set of relative frequency locations indicates different relative frequency locations than a second set of relative frequency locations associated with the second reference signal configuration.

In Aspect 20, the method of any of Aspects 18 or 19 includes where the first set of relative frequency locations are more dense within the first set of resource blocks than a second set of relative frequency locations within the second set of resource blocks associated with the second reference signal configuration.

In Aspect 21, the method of any of Aspects 18 to 20 includes where the second reference signal configuration indicates at least a second number of reference signal resource elements for transmitting the reference signal within the second set of resource blocks, where the second reference signal configuration indicates the second number of reference signal resource elements at least by indicating a second set of relative frequency locations within the second set of resource blocks, where the first set of relative frequency locations are not uniform within the first set of resource blocks, and where the second set of relative frequency locations are uniform within the second set of resource blocks.

In Aspect 22, the method of any of Aspects 18 to 21 includes where the second reference signal configuration indicates at least a second number of reference signal resource elements for transmitting the reference signal within the second set of resource blocks, and where the first set of resource blocks are closer in frequency than the second set of resource blocks to a set of uplink resource blocks in the one or more symbols used for full-duplex communications.

In Aspect 23, the method of any of Aspects 14 to 22 includes transmitting, to the UE, a first indication of the first reference signal configuration.

Aspect 24 is a method for wireless communications including receiving, over downlink resources allocated in one or more symbols used for full-duplex communications, a first set of resource blocks having a first reference signal configuration that is different in at least one of uniformity or density, in frequency, of resource elements indicated for receiving a reference signal than a second reference signal configuration, calculating, based on the first reference signal configuration, at least a first number of resource elements in the first set of resource blocks, and decoding, according to a transport block size that is based at least in part on at least the first number of resource elements, a downlink communication received in the downlink resources.

In Aspect 25, the method of Aspect 24 includes where the second reference signal configuration is a legacy reference signal configuration having a substantially uniform distribution, in frequency, of resource elements indicated for receiving the reference signal.

In Aspect 26, the method of any of Aspects 24 or 25 includes receiving, over the downlink resources allocated in the one or more symbols, a second set of resource blocks having the second reference signal configuration that is different from the first reference signal configuration, and calculating, based on the second reference signal configuration, a second number of resource elements in the second set of resource blocks, where decoding the downlink communication according to the transport block size is further based at least in part on the second number of resource elements.

In Aspect 27, the method of any of Aspects 24 to 26 includes where the first reference signal configuration indicates at least a first number of reference signal resource elements for receiving the reference signal within the first set of resource blocks.

In Aspect 28, the method of Aspect 27 includes where the first reference signal configuration indicates the first number of reference signal resource elements at least by indicating a first set of relative frequency locations within the first set of resource blocks.

In Aspect 29, the method of Aspect 28 includes where the first set of relative frequency locations indicates different relative frequency locations than a second set of relative frequency locations associated with the second reference signal configuration.

In Aspect 30, the method of any of Aspects 28 or 29 includes where the first set of relative frequency locations are more dense within the first set of resource blocks than a second set of relative frequency locations associated with the second reference signal configuration.

In Aspect 31, the method of any of Aspects 28 to 30 includes where the second reference signal configuration indicates at least a second number of reference signal resource elements for receiving the reference signal within a second set of resource blocks in the one or more symbols, where the second reference signal configuration indicates the second number of reference signal resource elements at least by indicating a second set of relative frequency locations within the second set of resource blocks, where the first set of relative frequency locations are not uniform within the first set of resource blocks, and where the second set of relative frequency locations are uniform within the second set of resource blocks.

In Aspect 32, the method of any of Aspects 28 to 31 includes where the second reference signal configuration indicates at least a second number of reference signal resource elements for receiving the reference signal within a second set of resource blocks in the one or more symbols, and where the first set of resource blocks are closer in frequency than the second set of resource blocks to a set of uplink resource blocks in the one or more symbols used for full-duplex communications.

In Aspect 33, the method of any of Aspects 27 to 32 includes where the second reference signal configuration indicates at least a second number of reference signal resource elements for receiving the reference signal within a second set of resource blocks in the one or more symbols, where calculating the first number of resources elements is based on the first number of reference signal resource elements, and further comprising calculating a second number of resources elements based on the second number of reference signal resource elements, where decoding the downlink communication according to the transport block size is further based at least in part on the second number of resource elements.

In Aspect 34, the method of Aspect 33 includes where the first reference signal configuration indicates at least a first overhead metric associated with the first set of resource blocks, where the second reference signal configuration indicates at least a second overhead metric associated with the second set of resource blocks, where calculating the first number of resources elements is further based on the first overhead metric, and where calculating the second number of resources elements is further based on the second overhead metric.

In Aspect 35, the method of any of Aspects 24 to 34 includes where the second reference signal configuration indicates at least a second number of reference signal resource elements for receiving the reference signal within a second set of resource blocks in the one or more symbols, where calculating the first number of resources elements is based on determining the first number of resource elements based on a number of allocated resource blocks and frequency location of the allocated resource blocks, and further comprising calculating a second number of resources elements is based on the second number of reference signal resource elements, where decoding the downlink communication according to the transport block size is further based at least in part on the second number of resource elements.

In Aspect 36, the method of any of Aspects 24 to 35 includes receiving, from a base station, an indication of the first reference signal configuration.

Aspect 37 is an apparatus for wireless communication including a transceiver, a memory configured to store instructions, and one or more processors communicatively coupled with the memory and the transceiver, where the one or more processors are configured to perform one or more of the methods of any of Aspects 1 to 36.

Aspect 38 is an apparatus for wireless communication including means for performing one or more of the methods of any of Aspects 1 to 36.

Aspect 39 is a computer-readable medium including code executable by one or more processors for wireless communications, the code including code for performing one or more of the methods of any of Aspects 1 to 36.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software (e.g., executed by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. If implemented in software (e.g., executed by a processor), the functions may be stored on or transmitted over as one or more instructions or code on a non-transitory computer-readable medium. Other examples and implementations are within the scope and spirit of the disclosure and appended claims. For example, due to the nature of software, functions described above can be implemented using software (e.g., executed by a specially programmed processor), hardware, hardwiring, or combinations of any of these. Features implementing functions may also be physically located at various positions, including being distributed such that portions of functions are implemented at different physical locations. Also, as used herein, including in the claims, "or" (e.g., as used in a list of items prefaced by "at least one of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory; and
one or more processors coupled with the memory and the transceiver, wherein the apparatus is configured to:
receive, in a symbol used for full-duplex communication, at least two sets of resource blocks for one instance of a transmission of a reference signal, the at least two sets of resource blocks including a first set of resource blocks including a first number of resource elements corresponding to the reference signal and a second set of resource blocks including a second number of resource elements corresponding to the reference signal,
wherein the first number of resource elements correspond to a first reference signal configuration and the second number of resource elements correspond a second reference signal configuration, and
wherein the first number of resource elements in accordance with the first reference signal configuration are different in at least one of uniformity or density, in frequency, than the second number of resource elements in accordance with the second reference signal configuration; and
decode, according to a transport block size that is based at least in part on at least the first number of resource elements, a downlink communication.

2. The apparatus of claim 1, wherein the apparatus is configured to:
calculate, based on the first reference signal configuration, the first number of resource elements in the first set of resource blocks; and
calculate, based on the second reference signal configuration, the second number of resource elements in the second set of resource blocks,
wherein, to decode the downlink communication, the apparatus is configured to decode the downlink communication according to the transport block size further based at least in part on the second number of resource elements.

3. The apparatus of claim 1, wherein the first reference signal configuration indicates at least the first number of resource elements.

4. The apparatus of claim 3, wherein the first reference signal configuration indicates the first number of resource elements at least by indication of a first set of relative frequency locations within the first set of resource blocks.

5. The apparatus of claim 4, wherein the first set of relative frequency locations indicates different relative frequency locations than a second set of relative frequency locations associated with the second reference signal configuration.

6. The apparatus of claim 4, wherein the first set of relative frequency locations are more dense within the first set of resource blocks than a second set of relative frequency locations associated with the second reference signal configuration.

7. The apparatus of claim 4, wherein the second reference signal configuration indicates at least the second number of resource elements, wherein the second reference signal configuration indicates the second number of resource elements at least by indication of a second set of relative frequency locations within the second set of resource blocks, wherein the first set of relative frequency locations are not uniform within the first set of resource blocks, and wherein the second set of relative frequency locations are uniform within the second set of resource blocks.

8. The apparatus of claim 4, wherein the second reference signal configuration indicates at least the second number of resource elements, and wherein the first set of resource blocks are closer in frequency than the second set of resource blocks.

9. The apparatus of claim 3, wherein the second reference signal configuration indicates at least the second number of resource elements.

10. The apparatus of claim 9, wherein the first reference signal configuration indicates at least a first overhead metric associated with the first set of resource blocks, wherein the second reference signal configuration indicates at least a second overhead metric associated with the second set of resource blocks, and wherein the apparatus is configured to:
calculate, based on the first reference signal configuration, the first number of resource elements in the first set of resource blocks; and
calculate, based on the second reference signal configuration, the second number of resource elements in the second set of resource blocks.

11. The apparatus of claim 1, wherein the second reference signal configuration indicates at least the second number of resource elements, wherein the apparatus is configured to:
calculate the first number of resource elements based on a number of allocated resource blocks and frequency location of the allocated resource blocks; and
calculate the second number of resource elements, wherein, to decode the downlink communication, the apparatus is configured to decode the downlink communication according to the transport block size based at least in part on the first number of resource elements and the second number of resource elements.

12. The apparatus of claim 1, wherein the apparatus is configured to receive, from a base station, an indication of the first reference signal configuration.

13. The apparatus of claim 1, wherein the second reference signal configuration is a legacy reference signal configuration having a substantially uniform distribution, in frequency, of resource elements indicated for receiving the reference signal.

14. An apparatus for wireless communication, comprising:
a transceiver;
a memory; and
one or more processors coupled with the memory and the transceiver, wherein the apparatus is configured to:
determine, for a symbol used for full-duplex communication, at least two sets of resource blocks for one instance of a transmission of a reference signal, the at least two sets of resource blocks including a first reference signal configuration for a first set of resource blocks including a first number of resource elements and a second reference signal configuration for a second set of resource blocks including a second number of resource elements, wherein the first number of resource elements in accordance with the first reference signal configuration are different in at least one of uniformity or density, in frequency, than the second number of resource elements in accordance with the second reference signal configuration; and
transmit, to a user equipment (UE), the reference signal over the first set of resource blocks based on the first reference signal configuration and the second set of resource blocks based on the second reference signal configuration.

15. The apparatus of claim 14, wherein the first reference signal configuration indicates at least the first number of resource elements.

16. The apparatus of claim 15, wherein the first reference signal configuration indicates the first number of resource elements at least by indication of a first set of relative frequency locations within the first set of resource blocks.

17. The apparatus of claim 16, wherein the first set of relative frequency locations indicates different relative frequency locations than a second set of relative frequency locations associated with the second reference signal configuration.

18. The apparatus of claim 16, wherein the first set of relative frequency locations are more dense within the first set of resource blocks than a second set of relative frequency locations within the second set of resource blocks associated with the second reference signal configuration.

19. The apparatus of claim 16, wherein the second reference signal configuration indicates at least the second number of resource elements, wherein the second reference signal configuration indicates the second number of reference signal resource elements at least by indication of a second set of relative frequency locations within the second set of resource blocks, wherein the first set of relative frequency locations are not uniform within the first set of resource blocks, and wherein the second set of relative frequency locations are uniform within the second set of resource blocks.

20. The apparatus of claim 16, wherein the second reference signal configuration indicates at least the second number of resource elements, and wherein the first set of resource blocks are closer in frequency than the second set of resource blocks.

21. The apparatus of claim 14, wherein the apparatus is configured to transmit, to the UE, a first indication of the first reference signal configuration.

22. The apparatus of claim 14, wherein the second reference signal configuration is a legacy reference signal configuration having a substantially uniform distribution, in frequency, of resource elements indicated for transmitting the reference signal.

23. A method of wireless communication, comprising:
receiving, in a symbol used for full-duplex communication, at least two sets of resource blocks for one instance of a transmission of a reference signal, the at least two sets of resource blocks including a first set of resource blocks including a first number of resource elements corresponding to the reference signal and a second set of resource blocks including a second number of resource elements corresponding to the reference signal, wherein the first number of resource elements correspond to a first reference signal configuration and the second number of resource elements correspond a second reference signal configuration, and wherein the first number of resource elements in accordance with the first reference signal configuration are different in at least one of uniformity or density, in frequency, than the second number of resource elements in accordance with the second reference signal configuration; and decoding, according to a transport block size that is based at least in part on at least the first number of resource elements, a downlink communication.

24. The method of claim 23, further comprising:
calculating, based on the first reference signal configuration, the first number of resource elements in the first set of resource blocks; and calculating, based on the second reference signal configuration, the second number of resource elements in the second set of resource blocks, wherein decoding the downlink communication according to the transport block size is further based at least in part on the second number of resource elements.

25. The method of claim 23, wherein the first reference signal configuration indicates at least the first number of resource elements.

26. The method of claim 25, wherein the first reference signal configuration indicates the first number of resource elements at least by indication of a first set of relative frequency locations within the first set of resource blocks.

27. A method of wireless communication, comprising:
determining, for a symbol used for full-duplex communication, at least two sets of resource blocks for one instance of a transmission of a reference signal, the at least two sets of resource blocks including a first reference signal configuration for a first set of resource blocks including a first number of resource elements and a second reference signal configuration for a second set of resource blocks including a second number of resource elements, wherein the first number of resource elements in accordance with the first reference signal configuration are different in at least one of uniformity or density, in frequency, than the second number of resource elements in accordance with the second reference signal configuration; and transmitting, to a user equipment (UE), the reference signal over the first set of resource blocks based on the first reference signal configuration and the second set of resource blocks based on the second reference signal configuration.

* * * * *